Sept. 17, 1929. E. BRUNHOFF 1,728,526
DISPENSING APPARATUS
Filed Feb. 1, 1927 2 Sheets-Sheet 1
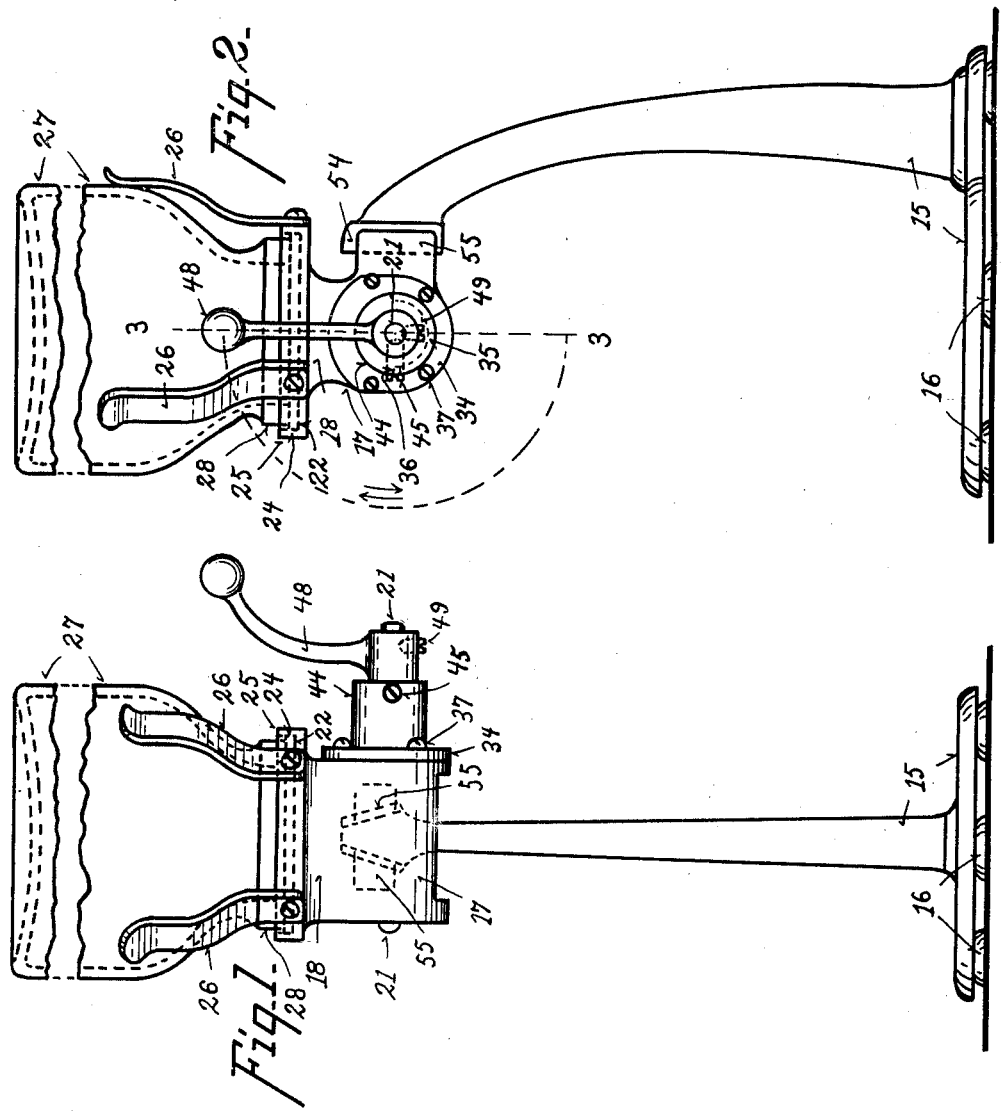
Inventor,
Edward Brunhoff,
By C. W. Miles.
Attorney.

Sept. 17, 1929.　　　　E. BRUNHOFF　　　　1,728,526
DISPENSING APPARATUS
Filed Feb. 1, 1927　　　2 Sheets-Sheet 2
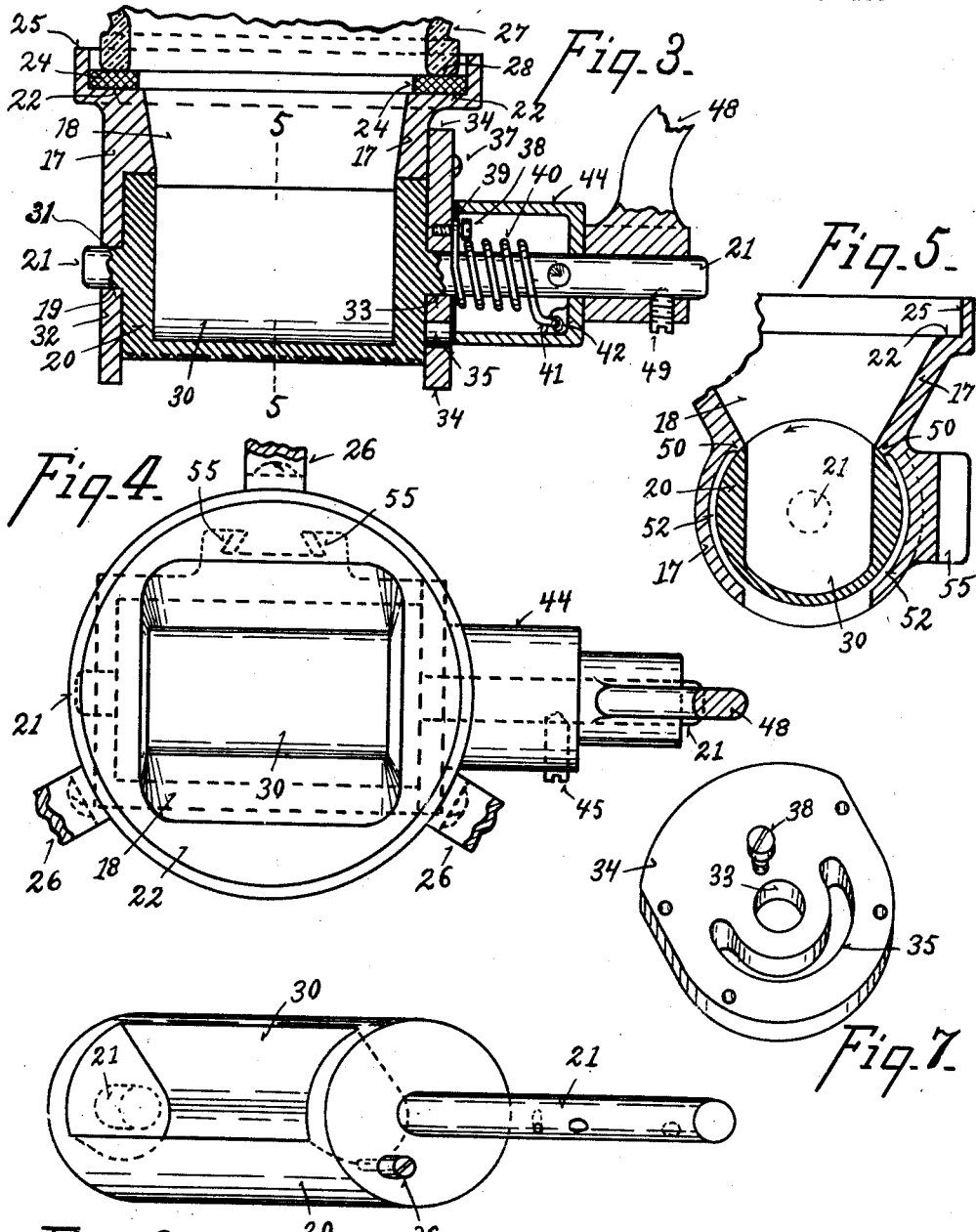
Inventor,
Edward Brunhoff
By C. W. Miles,
Attorney.

Patented Sept. 17, 1929.

1,728,526

UNITED STATES PATENT OFFICE

EDWARD BRUNHOFF, OF WYOMING, OHIO

DISPENSING APPARATUS

Application filed February 1, 1927. Serial No. 165,212.

My invention relates to improvements in dispensing apparatus. One of its objects is to provide improved dispensing apparatus adapted to be applied to the open mouth of an original container so as to dispense measured units therefrom. Another object is to provide improved dispensing apparatus detachably attached to its base member or support so as to be readily detached from the base member to invert the dispensing apparatus over the open mouth of the original container and attach it thereto before inverting the container over the dispensing apparatus and returning the dispensing apparatus to its base member. Another object is to provide improved simple and reliable dispensing apparatus. Another object is to provide dispensing apparatus adapted to operate reliably when dispensing powders, such as sugar, candy or malted milk for instance, which have a tendency to take up moisture and adhere to the walls of the dispensing apparatus. Another object is to provide improved dispensing apparatus adapted to be detached from its base and immersed in hot water and dried, to thereby remove sticky or gummy particles which may adhere to the walls of the dispensing apparatus and tend to render it unsanitary or inoperative, and thereby clean and restore the dispensing apparatus to operative condition ready to be replaced upon its base member. My invention also comprises certain details of form and arrangement and combination of components, all of which will be fully set forth in the description of the accompanying drawings, in which:

Figure 1 is a front elevation of a dispensing apparatus embodying my invention.

Figure 2 is a side elevation of the apparatus shown in Figure 1.

Figure 3 is an enlarged sectional detail taken on line 3—3 of Figure 2.

Figure 4 is a plan of the apparatus shown in Figure 3.

Figure 5 is a sectional detail taken on line 5—5 of Fig. 3.

Figure 6 is a perspective view of the dispensing shaft and bucket detached.

Figure 7 is a perspective view of the face plate detached.

The accompanying drawings illustrate the preferred embodiment of my invention in which 15 represents a pedestal or base member upon which the dispensing apparatus and original container from which the goods are to be dispensed are detachably mounted. A series of rubber cups or concave pneumatic suckers 16 are preferably attached to the under face of the base member to assist in holding the base member firmly in position with reference to a show-case or counter upon which the base may be mounted, and to prevent the dispensing apparatus being accidentally upset due to the strain applied to operate the dispensing apparatus.

The dispensing apparatus proper comprises a casing 17, having an upwardly directed hopper 18, and a cylindrical horizontal chamber 19 to receive and rotatably support the measuring and dispensing member 20 and its shaft or axle 21. The casing 17 above the hopper 18 is provided with an annular plane face 22 upon which is preferably seated a ring or gasket 24 of rubber, sheet cork or similar material, which is preferably held laterally in place by an annular raised rim 25. A series of upwardly directed spring fingers 26 are attached to the rim 25, and the upper ends of said fingers 26 are designed to yieldingly grasp the sides of a bottle or other original container 27 and hold it rigidly in place relative to the casing 17 with the rim 28 of the open mouth of the container 27 pressed and held in close engagement with the upper face of the gasket 24, to prevent the escape of any of the contents of the container at the joint between the container and the casing 17. The casing 17 is open at its lower end to discharge the contents of the container in measured units when the dispensing mechanism is actuated into receptacles held by hand beneath the casing 17.

The measuring and dispensing member comprises a cylindrical body 20, having an axle 21, and recessed to form a cup or measuring container 30, which is normally yieldingly held facing upwardly within the casing 17 ready to receive a unit volume or charge of the contents from the original container through the hopper 18. The short end of the axle 21 journals in a perforation 31 through one end wall 32 of the casing 17, and the longer end of the axle 21 journals in the perforation 33 in the detachable head 34 which closes the end of the cylindrical chamber 19 opposite to the wall 32. The wall 32 may be formed separately from the casing 17, but is preferably formed integral therewith.

The detachable head 34 is provided with a curved slot 35 into which projects a stud shaft or cylindrical screw head 36 carried by the member 20 to limit the rotary movement of the dispensing member 20 relative to the head 34 and casing 17. The head 34 is attached to the casing 17 by means of screws 37. A screw 38 projects from the outer face of the head 34 and to the screw 38 is attached an eye 39 at one end of a coiled spring 40, while an eye 41 at the opposite end of said spring is hooked into an eye or recess 42 on the inside of a spring housing member 44, whereby when the housing 44 is locked to the axle 21 by a set screw 45 the tension of the spring acts to hold the stud 36 normally at one end of the curved slot 35, and the cup or container 30 facing upwardly in position to receive anything discharged through the hopper 18.

A hand lever 48 is attached by means of a set screw 49 to the axle 21, preferably with the lever normally directed upwardly. The walls of the chamber 19 are preferably in close contact with the face of the cylindrical member 20 only for a short space at 50 close to the edges of the hopper 18, while at other localities a considerable free space 52 intervenes between the face of the member 20 and the walls of chamber 19, which prevents gummy or adhesive materials from accumulating upon closely adjacent faces to an extent sufficient to interfere with normal and reliable operation of the apparatus.

At the upper end of the base is a plate with downwardly diverging dovetailed edges 54, which are engaged by counterpart faces 55 carried by the casing 17, whereby the casing 17 may be readily detached from the base 15 by lifting upwardly thereon. This enables the casing 17 to be lifted from the base 15 and inverted and pressed down firmly over the open mouth of a bottle or other original container, and the container and casing 17 adjusted into position upon the base member 15 with the original container inverted over the casing 17, and without loss of any of the contents of the container.

In operation a glass or receptacle is held by hand beneath the casing 17, and the hand lever 48 turned through an arc of one hundred and eighty degrees until the stud 36 strikes the opposite end of the curved slot 35 and stops further rotation of the axle 21, whereupon the cup 30 having been inverted the contents thereof is discharged through the exit port of the casing 17 into the hand held glass or receptacle, and upon release of the hand lever 48, the spring 40 returns the dispensing member 20, axle 21, cup 30 and handle 48 to normal position where the cup is automatically refilled from the original container through the hopper 18.

When it is desired to clean the dispensing apparatus and to remove any gummy material adhering thereto, the dispensing apparatus may be detached from its base and immersed in hot water which dissolves the gummy material and cleans the dispensing apparatus, at the same time heating the dispensing apparatus sufficiently so that when the dispensing apparatus is removed from the hot water and the water shaken therefrom, the dispensing aparatus will become dry almost immediately and be clean and again ready for use. By loosening the set screw 45 and turning the housing 44 and again tightening the set screw 45, any desired degree of tension may be imparted by the spring 40 to hold the dispensing member 20 and its handle 48 in the desired position.

The apparatus herein shown and described is capable of considerable modification within the scope of the claims without departing from the spirit of my invention.

What I claim is:

1. A dispensing apparatus comprising a base member, a dispensing apparatus casing having a supply hopper and a discharge port, means to attach an original package with its open mouth in position to discharge the contents of said original package downwardly into said hopper, a measuring and dispensing member pivotally mounted upon a substantially horizontal axle within the interior of said casing, a casing head serving as a journal for one end of the dispensing member axle and to retain said dispensing member in position within said casing, a stud on the end of said dispensing member engaging in a curved slot in said head to limit the pivotal movement of said dispensing member, a spring coiled upon the axle of said dispensing member outside of said head and attached at one end to said head, a spring housing journaled loosely upon the axle of said dispensing member outside of said head and spring and to which the opposite end of said spring is attached, means to lock said spring housing rigidly to said axle at relatively different positions to enable the tension of said spring to be thereby variably adjusted, and an actuating lever mounted upon the axle of said dispensing member outside of said spring housing.

2. A dispensing apparatus comprising a base member, a dispensing apparatus casing adapted to be dropped downwardly upon and interengaged with said base member and having a supply hopper and a discharge port, means to attach an original package with its open mouth in position to discharge the contents of said original package downwardly into said hopper, a measuring and dispensing member pivotally mounted upon a substantially horizontal axle within the interior of said casing, a detachable head at one end of said casing in which said axle is journaled, interengaging means to limit the rocking movement of said axle and dispensing member relative to said casing, a spring housing rotatably adjustable upon said axle outside of said head, means to lock said spring housing rigidly to its adjusted position upon said axle, a spring housed within said spring housing and attached at one end thereto and attached at its opposite end to said casing head, and a hand lever adapted to rock said axle and dispensing member.

In testimony whereof I have affixed my signature.

EDWARD BRUNHOFF.